United States Patent
Wang et al.

(10) Patent No.: US 7,620,368 B2
(45) Date of Patent: Nov. 17, 2009

(54) SYSTEMS AND TECHNIQUES FOR TESTING A WIRELESS COMMUNICATIONS DEVICE

(75) Inventors: David E. Wang, La Jolla, CA (US); Amit Gil, San Diego, CA (US); Suhas Pai, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 621 days.

(21) Appl. No.: 10/804,874

(22) Filed: Mar. 19, 2004

(65) Prior Publication Data
US 2005/0208898 A1    Sep. 22, 2005

(51) Int. Cl.
*H04B 17/00*    (2006.01)
(52) U.S. Cl. ............... 455/67.11; 455/67.14; 455/226.1
(58) Field of Classification Search ............. 455/67.11, 455/67.14, 3.01–3.04, 10, 504, 506, 67.16, 455/115.1, 115.2, 226.1, 500; 367/90, 94, 367/904
See application file for complete search history.

(56) References Cited

U.S. PATENT DOCUMENTS

| 5,414,734 | A | * | 5/1995 | Marchetto et al. | ........... 375/267 |
| 6,085,103 | A | * | 7/2000 | Ramesh et al. | ............. 455/504 |
| 6,978,131 | B1 | * | 12/2005 | Lee | ............................. 455/423 |
| 2004/0248519 | A1 | * | 12/2004 | Niemela | .................. 455/67.11 |

* cited by examiner

*Primary Examiner*—Eugene Yun
(74) *Attorney, Agent, or Firm*—Nicholas J. Pauley; William M. Hooks

(57) ABSTRACT

Systems and techniques are disclosed relating to communications. The systems and techniques involve a method of testing a number of wireless subscriber stations. The testing methodology involves generating a broadcast signal, digitally creating a plurality of independently faded signals from the broadcast signal, and providing at least one of the faded signals to each of the wireless subscriber stations under test.

51 Claims, 4 Drawing Sheets

SYSTEMS AND TECHNIQUES FOR TESTING A WIRELESS COMMUNICATIONS DEVICE

BACKGROUND

1. Field

The present disclosure relates generally to communications, and more specifically, to systems and techniques for testing a wireless communications device.

2. Background

Modern communication systems are designed to allow multiple users to share a common communications medium. One such communications system is a Code Division Multiple Access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal. The transmitted signals are separated in the receiver by a correlator that uses a corresponding code to despread the signal. The undesired signals, whose codes do not match, are not despread and contribute only to noise.

In a CDMA communications system, a subscriber station may access a network, or communicate with other subscriber stations, through one or more base stations. The term "subscriber station" is intended to encompass any type of mobile communications device including cellular or wireless phones, personal data assistants (PDA), laptops, external or internal modems, PC cards, or any other similar devices. Each base station may be configured to serve all subscriber stations in a specific geographic region generally referred to as a cell.

In the mobile environment, transmitted signals are reflected and scattered by obstacles in their path, often resulting in multiple copies of the signal arriving at the receiver at different times. Depending on the location of the receiving antenna relative to the transmitting antenna, and the obstacles in the signal path, the multiple copies of the signal may combine constructively or destructively at the receiving antenna. In narrow band mobile applications, this phenomenon can cause fluctuations in the signal when the subscriber station travels even a small distance. This is often referred to as "fading". The use of a wide band CDMA signal can significantly reduce the impact of fast fading. Another technique to mitigate fading in mobile communications is to use multiple antennas to increase the gain of the signal due to spatial diversity.

Various test methods and devices have been developed over the years to verify the functionality of a subscriber station. One method for testing a subscriber station includes the use of an actual base station in the field. The problem with this approach is that all possible test scenarios cannot be easily accomplished.

A more practical method for testing a subscriber station is with a base station test set-up. The base station test set-up may be implemented with hardware and controlled by test software so as to mimic the functionality of an actual base station. The advantage of this approach is that virtually any test scenario may be programmed into the software. Moreover, the wireless medium can be controlled by use of a radio frequency (RF) cable between the base station test set-up and the subscriber station under test.

While the use of a base station test set-up provides an expanded range of test capabilities, this test method still fails to simulate real world propagation conditions, such as the ability of the subscriber station to deal with fading. This problem is not limited to CDMA systems. Accordingly, there is a need for a new testing methodology applicable to a wide range of applications.

SUMMARY

In one aspect of the present invention, a method of testing a plurality of wireless subscriber stations includes generating a broadcast signal, digitally creating a plurality of independently faded signals from the broadcast signal, and providing at least one of the faded signals to each of the wireless subscriber stations under test.

In another aspect of the present invention, an apparatus to test a plurality of wireless subscriber stations includes a simulator configured to generate a broadcast signal, a digital processor configured to create a plurality of independently faded signals from the broadcast signal, and an interface configured to provide at least one of the faded signals to each of the wireless subscriber stations under test.

In a further aspect of the present invention, an apparatus to test a plurality of wireless subscriber stations includes means for generating a broadcast signal, means for digitally creating a plurality of independently faded signals from the broadcast signal, and means for providing at least one of the faded signals to each of the wireless subscriber stations under test.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of a testing methodology for video conferencing in a CDMA communications system. While these inventive aspects may be well suited for use with this application, those skilled in the art will readily appreciate that these inventive aspects are likewise applicable for use in various other communication environments. Accordingly, any reference to a CDMA communications system in general, and video conferencing in particular, is intended only to illustrate the inventive aspects of the present invention, with the understanding that such inventive aspects have a wide range of applications.

Figure 1:
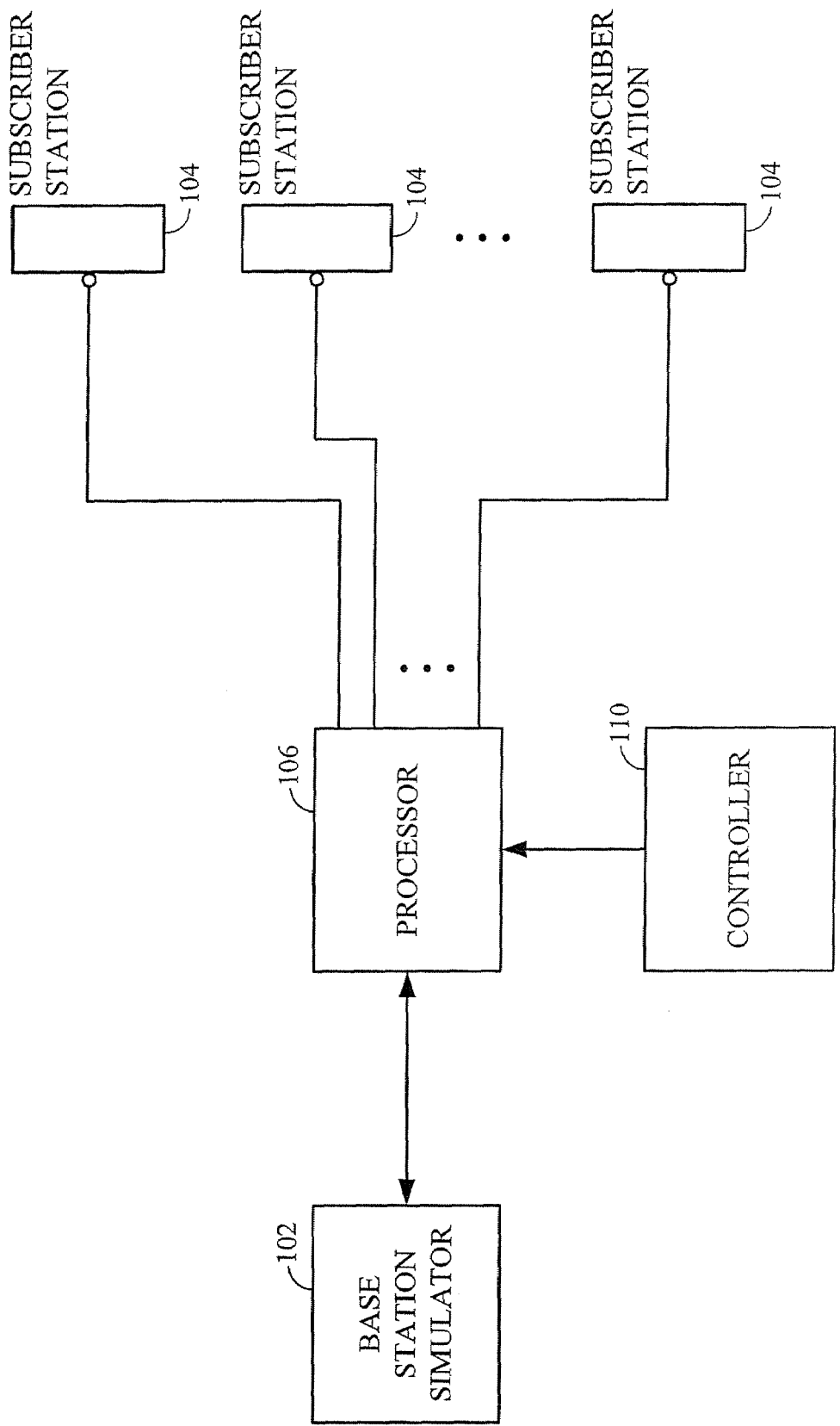
FIG. 1 is a conceptual block diagram of a test set-up for multiple subscriber stations.

FIG. 1 is a conceptual block diagram of a test set-up for multiple subscriber stations. A base station simulator 102 may be used to simulate the functionality of a base station. More specifically, the base station simulator 102 may be used to generate voice, data and/or video packets for transmission to each subscriber station 104 under test. The base station simulator 102 may also be used to extract voice, data and/or video packets received from the subscriber stations 104 under test. The base station simulator 102 may also provide various signal processing functions such as pilot signal acquisition, time synchronization, frequency tracking, spread-spectrum processing, modulation and demodulation functions, and forward error correction.

A digital processor 106 may be coupled between the base station simulator 102 and the subscriber stations 104. The digital processor 106 may be used to emulate various over-the-air propagation models. By way of example, the digital processor 106 may be configured to emulate two independently faded signal paths to each subscriber station 104 under test in a forward link direction, and two independently faded signal paths back to the base station simulator 102 in a reverse link direction. The use of two independently faded channels may be used to simulate two spatially separated antennas. A controller 110 may be used to control the over-the-air propagation models emulated by the digital processor 106. The controller 110 may be integrated with the base station simulator 102 and the digital processor 106. Alternatively, the controller 110 may be an external device such as a remote computer or the like.

Although the digital processor 106 may be implemented with two independently faded signal paths in both the forward and reverse link directions, it will be understood by those skilled in the art that one or more subscriber stations may be completely tested with only two faded signal paths in the forward link. The ability of the digital processor 106 to provided signal fading in both directions, however, may provide greater testing capability. By way of example, an existing base station that expects to see two faded signals may be used as the base station simulator. In addition to that, certain closed loop features, such as power control, may be emulated in a more realistic manner. Moreover, a subscriber station simulator may be used to test an actual base station. Those skilled in the art will be readily able to determine whether the digital processor 106 should be used to generate reverse link faded signals based on the particular testing application and the overall design constraints.

A personal computer (not shown), or other user controlled device, may be coupled to one or more subscriber stations 104 under test for user interactive test applications and performance monitoring. The personal computer connection may be a cable connection, or alternatively, a wireless link for greater test configuration flexibility. Alternatively, the base station simulator 102 and/or the digital processor 106 may be configured for automatic testing and monitoring without the need for a personal computer.

Figure 2:
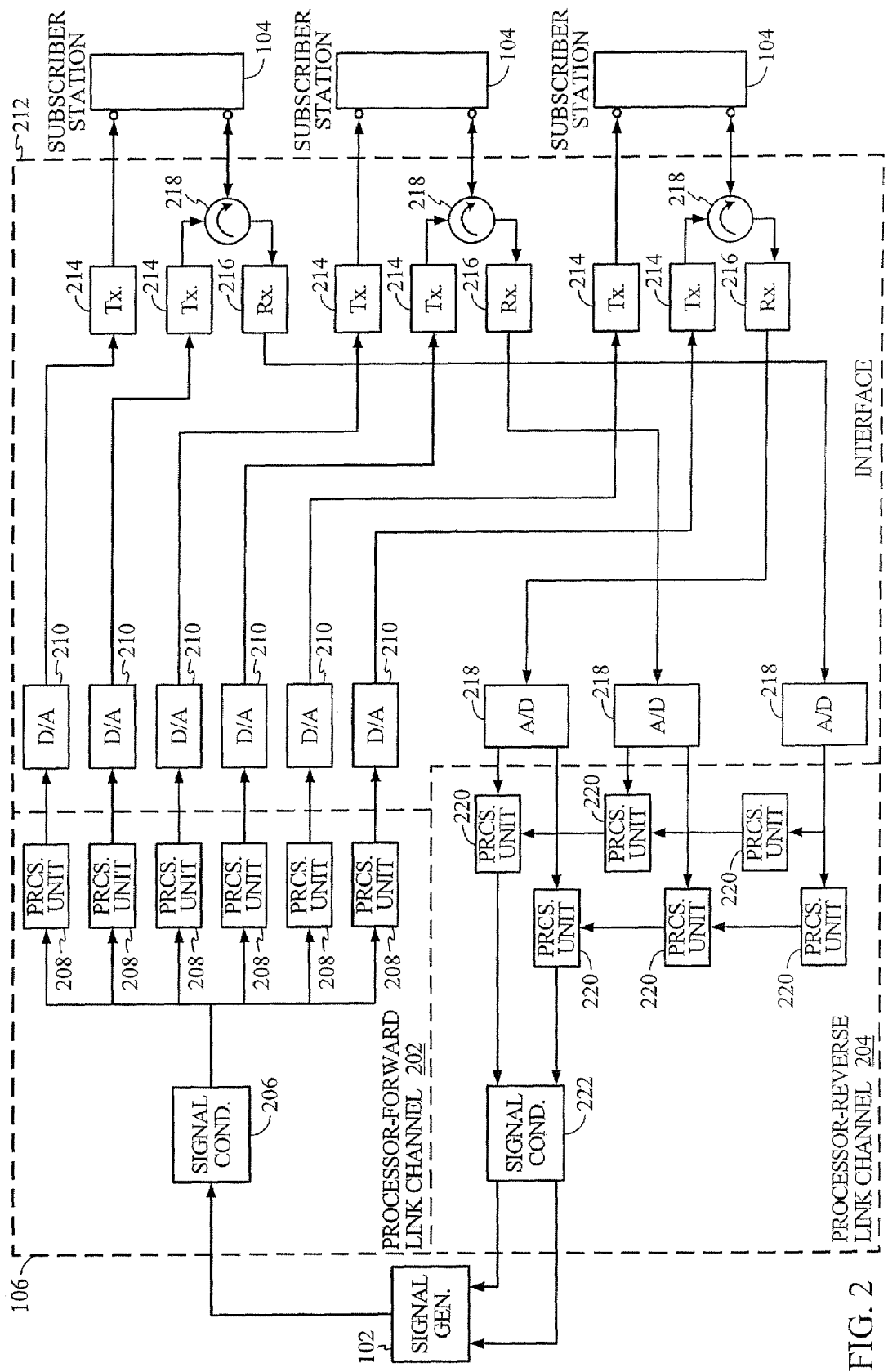
FIG. 2 is a functional block diagram of a test set-up configured to provide video conferencing between multiple subscriber stations under test.

FIG. 2 is a functional block diagram of the digital processor 106 configured to provide video conferencing between multiple subscriber stations 104 under test. In this configuration, a video broadcast from the base station simulator 102 may be distributed to each subscriber station 104 under test over a forward link channel 202. Similarly, video from each of subscriber stations 104 under test may be combined and routed back to the base station simulator 102 over a reverse link channel 204.

The forward link channel 202 may include a signal conditioner 206 feeding multiple processing units 208. The signal conditioner 206 may be used to receive a digital baseband signal from the base station simulator 102 and provide various signal conditioning functions such as pulse shaping, equalization and filtering. The signal conditioner 206 is shown merely as an implementation detail and is not necessary to the practice inventive concepts described throughout this disclosure. The purpose of the signal conditioner 206 is to interface the base station simulator 102 to the processing units 208. However, as those skilled in the art will readily appreciate, the processing units 208 may be designed to process the digital baseband signal directly from the base station simulator 102.

The processing units 208 may be used to emulate various over-the-air propagation models such as fading. In the embodiment shown in FIG. 2, two processing units 208 may be dedicated to each subscriber station 104 under test to emulate a faded signal received by two spatially separated antennas. Alternatively, a single processing unit may be dedicated to each processing unit 208 to emulate a faded signal without spatial diversity.

Each processing unit 208 may be configured to emulate a different fading model. The fading model emulated by each processing unit 208 may be fixed or programmable. In a manner to be described in greater detail later, the processing unit 208 may be programmed by one or more parameters generated by the controller 110. The parameters may be programmed by the controller 110 either manually or in an automated fashion. During test, the parameters may be static or dynamically cycled to emulate a changing mobile environment. Moreover, the fading model emulated by each processing unit 208 may be entirely independent of the fading models emulated by the other processing units 208.

The independently faded signal paths emulated by the digital processor 106 may be delivered to the subscriber stations 104 under test by an interface 212. The interface 212 may include a digital-to-analog (D/A) converter 210 and a transmitter 214 at the output of each processing unit 208 as shown in FIG. 2. The transmitter 214 may employ a direct conversion architecture capable of converting an analog baseband signal directly to RF. Alternatively, the transmitter 214 may employ an IF stage capable of converting an analog baseband signal to one or more IF frequencies before upconverting the signal to a RF frequency. In at least one embodiment of the test set-up, the independently faded signal path emulated by the processing unit 106 may be output as a digital IF signal to reduce the complexity of the interface 212.

The interface 212 may also include a receiver 216 and an analog-to-digital (A/D) converter 218 to handle each subscriber station transmission. The receiver 216 may employ a direct conversion architecture capable of converting a RF signal directly to baseband. Alternatively, the receiver 216 may employ an IF stage capable of converting RF to one or more IF frequencies before downconverting the signal to baseband. In at least one embodiment of the test set-up, the output of each A/D converter 218 may be a digital IF signal to reduce the complexity of the interface 212.

The specific number of transmitters and receivers used in the interface 212 will depend on the configuration of the subscriber stations and the number of subscriber stations under test. In the test set-up shown in FIG. 2, three subscriber stations 104 are undergoing test. These subscriber stations 104 have a dual antenna arrangement, employing spatial diversity combining techniques for the received signal and using a single antenna to transmit. Thus, every subscriber station 104 under test will have a receive/transmit antenna port and a receive only antenna port. Each receive/transmit antenna port on the subscriber station 104 may be connected to one transmitter 214 and one receiver 216 in the interface 212 through a duplexer 218. The interface 212 may also employ one transmitter 214 to feed each receive only antenna port. In alternative embodiments in which the subscriber station 104 under test has only a receive/transmit antenna port, it may be connected to only one transmitter.

The specific implementation of the interface 212 may vary depending on the particular testing requirements. By way of example, the test set-up may be used to test the functionality of a baseband processor in the subscriber station. In this case, the independently faded signal paths emulated by the processor 106 may be provided directly to the subscriber stations 104, and likewise, communications from the subscriber stations may be provided directly to the processor 106. Consequently, the interface 212 may be configured with appropriate drivers, filters and amplifiers, and in some instances may consist of nothing more than a suitable connector cable between the processor 106 and the subscriber stations 104 under test.

The output of each A/D converter 218 may be used to feed two processing units 220 in the reverse link channel 204 of the processor 106. Similar to the processing units 208 in the forward link channel 202, the processing units 220 in the reverse link channel may be used to emulate various over-the-air propagation models such as fading. Each processing unit 220 may be configured to emulate a different fading model. The fading model emulated by each processing unit 220 may be fixed or programmable. In a manner to be described in greater detail later, a processing unit 220 may be programmed by one or more parameters generated by the controller 110. The parameters may be programmed by the controller 110 either manually or in an automated fashion. During test, the parameters may be static or dynamically cycled to emulate a changing mobile environment. Moreover, the fading model emulated by each processing unit 220 may be entirely independent of the fading models emulated by the other processing units 220.

Two processing units 220 may be dedicated to each subscriber station 104 under test to emulate two faded signal paths to the base station simulator 102, which would be the result of a base station using two spatially separated antennas. Alternatively, a single processing unit may be dedicated to each subscriber station under test to emulate a faded signal without spatial diversity. The signal outputs from the processing units 220 for one faded signal path may be combined, and the signal outputs from the processing units 220 for the other faded signal path may be combined. The result is two composite faded signal paths for delivery to the base station simulator 102. The combining of the faded signal outputs may be done in a serial fashion as shown in FIG. 2, or alternatively, in a parallel.

The reverse link channel 204 may include a signal conditioner 222. The signal conditioner 222 may be used to receive the two composite signals from the processing units 220 and provide various signal conditioning functions such as automatic gain control and filtering. Similar to the signal conditioner 206 in the forward link channel, this signal conditioner 220 is an implementation detail and is not required to practice the inventive concepts described throughout this disclosure. The purpose of the signal conditioner 220 is to interface the processing units 220 to the base station simulator 102. However, as those skilled in the art will readily appreciate, the processing units 220 may be designed to drive the base station simulator 102 directly.

Figure 3:
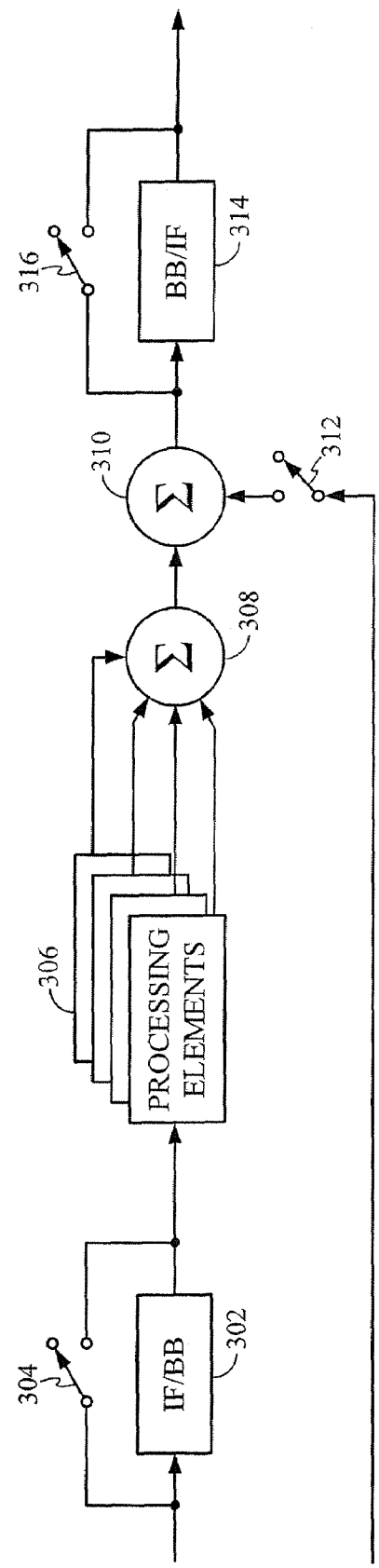
FIG. 3 is a functional block diagram of a processing unit configured to fade a digital signal.

FIG. 3 is a functional block diagram of a processing unit. In this embodiment, the processing unit may be configurable by the controller to operate in either the forward link channel or the reverse link channel. In the forward link channel, the processing unit may be configured to output an IF signal. In the reverse link channel, the processing unit may be configured to receive an IF signal.

Referring to FIG. 3, a digital IF-to-baseband (IF/BB) converter 302 may be positioned at the input to the processing unit. The IF/BB converter 302 may be used to downconvert a digital IF signal to baseband by means well known in the art in the reverse link channel. A bypass circuit 304 may be used to bypass the IF/BB converter 302 when the processing unit is operating in the forward link channel. The bypass circuit 304 may be a switch, transistor, or any other suitable component. The bypass circuit 304 may be controlled by the controller, or by other means, to ensure a digital baseband signal is applied to multiple processing elements 306 downstream.

The processing elements 306 in combination with an adder 308 may be used to emulate a faded signal path. In the embodiment shown in FIG. 3, there are four processing elements 306. The processing elements 306 may be used to generate multiple copies of the signal, each emulating a different over-the-air propagation path to simulate reflections and scattering. The adder 308 may be used to combine the multiple copies of the signal output from the processing elements 306. The controller may be used to dynamically program each processing element 306 to continuously change the over-the-air propagation path to simulate a mobile subscriber station in relation to a fixed site base station. Depending on the multipaths generated by the processing elements 306, the signals may add in a destructive way at one moment and reinforce each other in the next moment to emulate a faded signal. The manner in which the signal adds in a constructive or destructive way may be controlled by different fading models in the controller.

A second adder 310 may be used to combine the faded signal from the previous stage to the faded signal produced by the processing elements 306 and the first adder 308 (see FIG. 2). A switching circuit 312 may be used to provide an external input into the second adder 310 when the processing unit is operating in the reverse link channel, and remove the external input from the second adder 310 when the processing unit is operating in the forward link channel. In an alternative embodiment, the switching circuit 312 may be used to add additional forward link multipaths from other processing units. The switching circuit 312 may be a switch, transistor, or any other suitable component. The switching circuit 312 may be controlled by the controller, or by other means.

A digital baseband-to-IF (BB/IF) converter 314 may be positioned at the output to the second adder 310. The BB/IF converter 314 may be used to upconvert the digital baseband signal to IF by means well known in the art in the forward link channel. A bypass circuit 316 may be used to bypass the BB/IF converter 314 when the processing unit is operating in the reverse link channel. The bypass circuit 314 may be a switch, transistor, or any other suitable component. The bypass circuit 304 may be controlled by the controller, or by other means.

Figure 4:
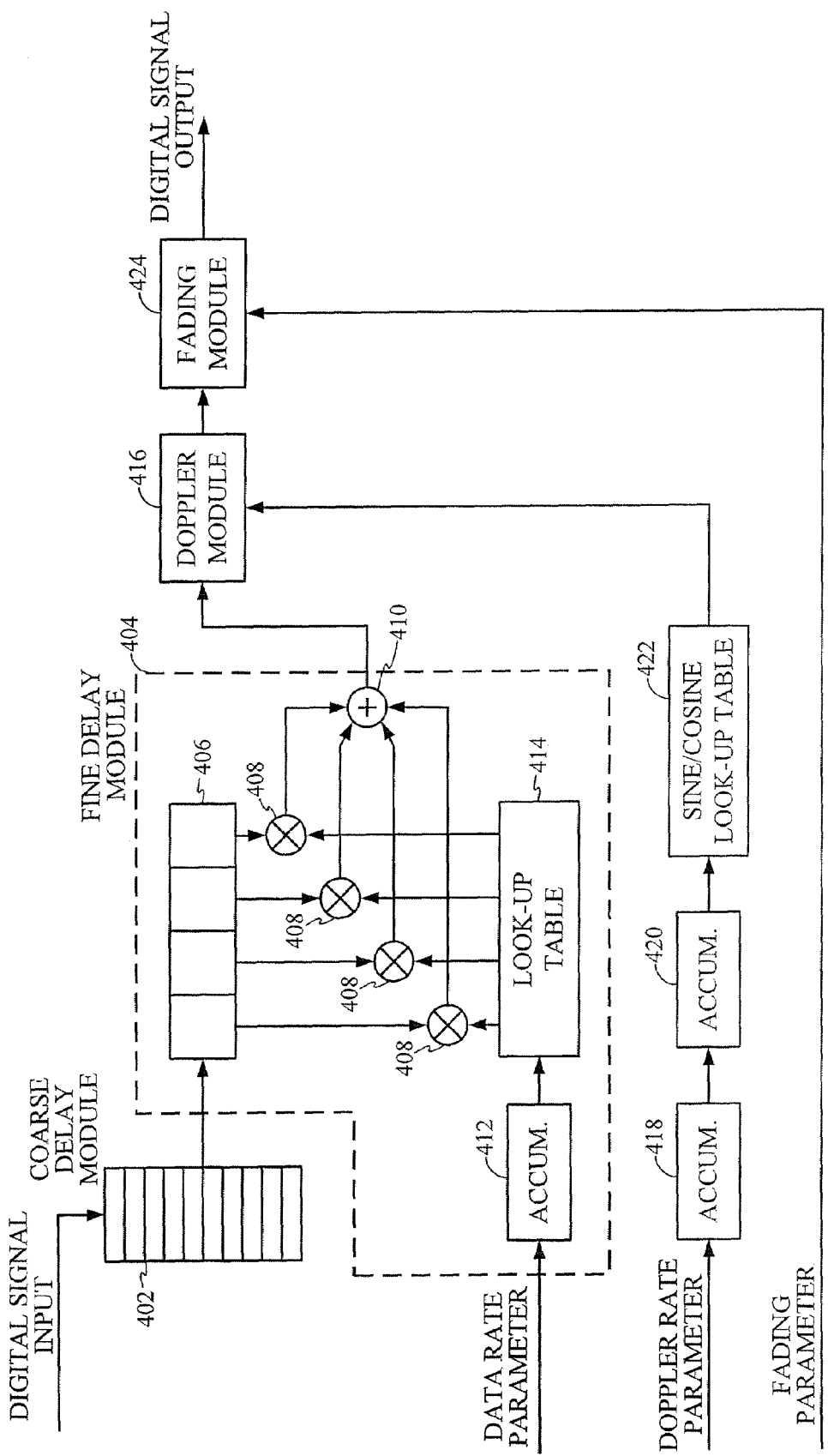
FIG. 4 is a functional block diagram of a processing element that may be used in the processing unit of FIG. 3.

FIG. 4 is a functional block diagram of a processing element. A coarse delay module 402 may be used to delay the digital input signal. The delay module 402 may be implemented as a delay line, shift register, first-in-first-out (FIFO) memory, or any other suitable circuit. The controller may be used to control the delay of the digital input signal by adjusting the depth of the module.

A fine delay module 404 may be used to fine tune the delay. The fine delay module 404 may be implemented with a tapped delay line 406. The tapped delay line 406 may employ delay elements arranged in series to temporarily store the serial outputs from the coarse delay module 402. The output of the delay elements may be multiplied with coefficient tap values with a number of multipliers 408 (one for each delay element output) as shown in FIG. 4. The outputs of the multipliers 408 may be summed by an adder 410 to produce a digital signal having a programmed delay.

The coefficient tap values may be based on a "delay rate" parameter that may be programmed by the controller. The delay rate parameter represents the simulated velocity of the mobile subscriber station. An accumulator 412 may be used to generate a digital signal representative of the distance between the base station and the mobile subscriber station at different moments as the subscriber station travels at the velocity set by the controller. A look-up table 414 may be used to generate the appropriate coefficient tap values.

A doppler module 416 may be used to create a digital doppler frequency shift in the delayed signal. A "doppler frequency shift" is a change in the RF carrier frequency that results when the subscriber station is in motion. Typically, the doppler module 416 will be enabled only when simulating a Global Positioning Satellite (GPS) signal where the doppler frequency shift is significant. When simulating cellular communications, the doppler module 416 may be disabled because the expected doppler frequency shift is negligible. In any event, the doppler module 416 may emulate a doppler frequency shift by multiplying the delayed signal output from the adder 410 with a digital signal representative of a doppler frequency shift.

The doppler frequency shift may be based on a "doppler rate" parameter programmed by the controller. The doppler rate parameter also represents the simulated velocity of the mobile subscriber station. An accumulator 418 may be used to generate a digital signal representative of the change in phase of the carrier as the distance between the base station and the mobile subscriber station changes. A second accumulator 420 may be used to generate a digital signal representative of the rate of change of the carrier phase at the simulated velocity of the subscriber station. The rate of change of the carrier phase represents a change in frequency and may be converted to a digital signal representative of the doppler frequency shift using a sine/cosine look-up table 422.

A fading module 424 may be used to attenuate and phase shift the signal from the doppler module 416. This may be achieved by multiplying the signal from the doppler module 416 with a "fading" parameter generated by the controller. The fading parameter may include two fading coefficients. One fading coefficient may be multiplied with an in-phase (I) component of the signal and the other fading coefficient may be multiplied with a quadrature component (Q) of the signal. The fading coefficients may be generated by processing two independent pseudo-random signals with low pass filters. The low pass filter may be configured with a bandwidth equal to the expected doppler frequency resulting from the simulated fading conditions. Since the doppler frequency varies with the velocity of the mobile subscriber station, appropriate fading models may be generated for different simulated speeds.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of testing a plurality of wireless subscriber stations, comprising:
   generating a broadcast signal;
   digitally creating in a digital processor a plurality of independently faded signals from the broadcast signal;
   selectively creating, in the digital processor, a plurality of doppler frequency shifted signals from the plurality of independently faded signals to generate a plurality of independently faded, selectively doppler shifted signals; and
   transmitting the plurality of digitally created, independently faded, selectively doppler shifted signals from a transmitter to each of the wireless subscriber stations under test.

2. The method of claim 1 further comprising monitoring each of the subscriber stations under test to determine whether it can recover the broadcast signal from the plurality of independently faded selectively doppler shifted signals.

3. The method of claim 1 further comprising receiving a signal from each of the wireless subscriber stations under test, digitally creating at least one independently faded signal from each of the received signals, and generating a second broadcast signal for the wireless subscriber stations under test based on said at least one independently faded signal created from each of the received signals.

4. The method of claim 1 further comprising converting each of the digitally created faded signals to an analog faded signal at a carrier frequency before transmitting the plurality of independently faded selectively doppler shifted signals to their respective subscriber stations.

5. The method of claim 1 wherein the plurality of independently faded signals includes a first faded signal and a second faded signal, the first faded signal having a different fading model than the second faded signal.

6. The method of claim 1 wherein each of the plurality of independently faded signals is digitally created by generating multiple copies of the broadcast signal, independently scaling each of the multiple copies as a function of one or more parameters relating to a fading model, and combining the result.

7. The method of claim 6 further comprising applying a doppler frequency shift to each of the multiple copies.

8. The method of claim 6 further comprising applying a delay to each of the multiple copies.

9. The method of claim 1 wherein the broadcast signal comprises video.

10. The method of claim 1 wherein the broadcast signal comprises a spread-spectrum signal.

11. The method of claim 1 further comprising monitoring a digital communications signal from each of the subscriber stations under test.

12. The method of claim 11 wherein the digital communications signal from each of the subscriber stations under test is monitored by digitally creating two independently faded signals from each of the subscriber stations, combining a first one of the two independently faded signals from each of the subscriber stations under test, combining a second one of the two independently faded signals from each of the subscriber stations under test, and attempting to recover the digital communications signal from each of the subscriber stations under test from the first and second ones of the combined independently faded signals.

13. The method of claim 1, wherein transmitting the plurality of digitally created, independently faded, selectively doppler shifted signals comprises:
transmitting a first of the plurality of digitally created, independently faded, selectively doppler shifted signals to a first antenna port of a first wireless subscriber station under test; and
transmitting a second of the plurality of digitally created, independently faded, selectively doppler shifted signals to a second antenna port of a first wireless subscriber station under test, wherein the second antenna port is spatially diverse from the first antenna port.

14. An apparatus to test a plurality of wireless subscriber stations, comprising:
a base station simulator configured to generate a broadcast signal;
a digital processor configured to digitally create a plurality of independently faded and selectively doppler shifted signals from the broadcast signal; and
an interface configured to transmit the digitally created plurality of independently faded and selectively doppler shifted signals to each of the wireless subscriber stations under test.

15. The apparatus of claim 14 wherein the digital processor is further configured to receive a signal from each of the wireless subscriber stations under test, digitally create at least one independently faded signal from each of the received signals, and provide said at least one independently faded signal created from each of the received signals to the base station simulator.

16. The apparatus of claim 14 wherein the interface comprises a plurality of subscriber station test connections.

17. The apparatus of claim 14 wherein the interface is configured to convert each of the faded signals to an analog faded signal at a carrier frequency.

18. The apparatus of claim 14 wherein the plurality of independently faded signals includes a first faded signal and a second faded signal, the first faded signal having a different fading model than the second faded signal.

19. The apparatus of claim 14 wherein the digital processor further comprises a plurality of processing units each being configured to generate one of the plurality of independently faded signals.

20. The apparatus of claim 19 wherein each of the processing units comprises a plurality of processing elements each being configured to independently scale the broadcast signal as a function of one or more parameters relating to a fading model, and a combiner configured to combine the independently scaled broadcast signals.

21. The apparatus of claim 20 wherein each of the processing elements is further configured to apply a doppler frequency shift to the broadcast signal.

22. The apparatus of claim 20 wherein each of the processing elements is further configured to apply a delay to the broadcast signal.

23. The apparatus of claim 14 wherein the broadcast signal comprises video.

24. The apparatus of claim 14 wherein the broadcast signal comprises a spread-spectrum signal.

25. The apparatus of claim 14 wherein the interface is further configured to receive a communications signal from each of the subscriber stations under test, and wherein the digital processor is further configured to create two independently faded signals from each of the communications signals, combine a first one of the two independently faded signals created from each of the communications signals, combine a second one of the two independently faded signals created from each of the communications signals, and attempt to recover each of the communications signals from the first and second ones of the combined independently faded signals.

26. An apparatus to test a plurality of wireless subscriber stations, comprising:
means for generating a broadcast signal;
means for digitally creating a plurality of independently faded selectively doppler shifted signals from the broadcast signal; and
means for transmitting the plurality of digitally created, independently faded selectively doppler shifted signals to each of the wireless subscriber stations under test.

27. The apparatus of claim 26 further comprising means for monitoring each of the subscriber stations under test to determine whether it can recover the broadcast signal from the plurality of independently faded selectively doppler shifted signals.

28. The apparatus of claim 26 further comprising means for receiving a signal from each of the wireless subscriber stations under test, digitally creating at least one independently faded signal from each of the received signals, and generating a second broadcast signal for the wireless subscriber stations under test based on said at least one independently faded signal created from each of the received signals.

29. The apparatus of claim 26 further comprising means for converting each of the digitally created faded signals to an analog faded signal at a carrier frequency before transmitting the plurality of independently faded signals to their respective subscriber stations.

30. The apparatus of claim 26 wherein the plurality of independently faded signals includes a first faded signal and a second faded signal, the first faded signal having a different fading model than the second faded signal.

31. The apparatus of claim 26 wherein each of the plurality of independently faded signals is digitally created by generating multiple copies of the broadcast signal, independently scaling each of the multiple copies as a function of one or more parameters relating to a fading model, and combining the result.

32. The apparatus of claim 31 further comprising means for applying a doppler frequency shift to each of the multiple copies.

33. The apparatus of claim 31 further comprising means for applying a delay to each of the multiple copies.

34. The apparatus of claim 26 wherein the broadcast signal comprises video.

35. The apparatus of claim 26 wherein the broadcast signal comprises a spread-spectrum signal.

36. The apparatus of claim 26 further comprising means for monitoring a digital communications signal from each of the subscriber stations under test.

37. The apparatus of claim 36 wherein the digital communications signal from each of the subscriber stations under test is monitored by digitally creating two independently faded signals from each of the subscriber stations, combining a first one of the two independently faded signals from each of the subscriber stations under test, combining a second one of the two independently faded signals from each of the subscriber stations under test, and attempting to recover the digital communications signal from each of the subscriber stations under test from the first and second ones of the combined independently faded signals.

38. A machine-readable medium comprising instructions to test a
plurality of wireless subscriber stations, the instructions upon execution cause a machine to: generate a broadcast signal; digitally create a plurality of independently faded signals from the broadcast signal;
selectively create a plurality of doppler frequency shifted signals from the plurality of independently faded signals to generate a plurality of independently faded, selectively doppler shifted signals; and
transmit the plurality of digitally created, independently faded, selectively doppler shifted signals to each of the wireless subscriber stations under test.

39. The machine-readable medium of claim 38 further comprising instructions to monitor each of the subscriber stations under test to determine whether it can recover the broadcast signal from the plurality of independently faded selectively doppler shifted signals.

40. The machine-readable medium of claim 38 further comprising instructions to receive a signal from each of the wireless subscriber stations under test, digitally create at least one independently faded signal from each of the received signals, and generate a second broadcast signal for the wireless subscriber stations under test based on the at least one independently faded signal created from each of the received signals.

41. The machine-readable medium of claim 38 further comprising instructions to convert each of the digitally created faded signals to an analog faded signal at a carrier frequency before transmitting the plurality of independently faded signals to their respective subscriber stations.

42. The machine-readable medium of claim 38 wherein the plurality of independently faded signals includes a first faded signal and a second faded signal, the first faded signal having a different fading model than the second faded signal.

43. The machine-readable medium of claim 38 wherein each of the plurality of independently faded signals is digitally created by generating multiple copies of the broadcast signal, independently scaling each of the multiple copies as a function of one or more parameters relating to a fading model, and combining the result.

44. The machine-readable medium of claim 43 further comprising instructions to apply a doppler frequency shift to each of the multiple copies.

45. The machine-readable medium of claim 43 further comprising instructions to apply a delay to each of the multiple copies.

46. The machine-readable medium of claim 38 wherein the broadcast signal comprises video.

47. The machine-readable medium of claim 38 wherein the broadcast signal comprises a spread-spectrum signal.

48. The machine-readable medium of claim 38 further comprising instructions to monitor a digital communications signal from each of the subscriber stations under test.

49. The machine-readable medium of claim 48 wherein the digital communications signal from each of the subscriber stations under test is monitored by digitally creating two independently faded signals from each of the subscriber stations, combining a first one of the two independently faded signals from each of the subscriber stations under test, combining a second one of the two independently faded signals from each of the subscriber stations under test, and attempting to recover the digital communications signal from each of the subscriber stations under test from the first and second ones of the combined independently faded signals.

50. A method for testing wireless subscriber stations, the method comprising:
generating a broadcast signal in a base station simulator separate from the wireless subscriber stations;
digitally creating in a digital processor separate from the wireless subscriber stations a plurality of independently faded and selectively doppler shifted signals from the broadcast signal; and
transmitting the digitally created, independently faded and selectively doppler shifted signals from one or more transmitters associated with the digital processor to one or more of the wireless subscriber stations.

51. A system comprising:
a plurality of wireless subscriber stations; and
an apparatus, separate from the wireless subscriber stations, to test the plurality of wireless subscriber stations, the apparatus comprising:
a base station simulator configured to generate a broadcast signal,
a digital processor configured to digitally create a plurality of independently faded and selectively doppler shifted signals from the broadcast signal, and
an interface configured to transmit the digitally created, plurality of independently faded and selectively doppler shifted signals to one or more of the wireless subscriber stations.

* * * * *

UNITED STATES PATENT AND TRADEMARK OFFICE
CERTIFICATE OF CORRECTION

PATENT NO. : 7,620,368 B2
APPLICATION NO. : 10/804874
DATED : November 17, 2009
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 909 days.

Signed and Sealed this

Fourteenth Day of December, 2010

David J. Kappos
*Director of the United States Patent and Trademark Office*